W. H. SWAN.
KNIVES FOR FLOCKING CUTTING MACHINES.

No. 175,521. Patented March 28, 1876.

UNITED STATES PATENT OFFICE.

WILLARD H. SWAN, OF SOUTH MILFORD, MASSACHUSETTS.

IMPROVEMENT IN KNIVES FOR FLOCKING CUTTING MACHINES.

Specification forming part of Letters Patent No. 175,521, dated March 28, 1876; application filed March 20, 1875.

*To all whom it may concern:*

Be it known that I, WILLARD H. SWAN, of South Milford, in the county of Worcester and State of Massachusetts, have invented a new and useful Improvement in Knives for Flock-Cutting Machines, of which the following, taken in connection with the accompanying drawings, is a specification:

My invention relates to the form of the knives to be used in flock-cutting machines; and it consists in constructing said knives with one or both of their radial sides serrated, so as to form thereon a series of teeth, extending across said knives in a direction radial, or nearly so, to the axis of the cylinder of the machine in which they are to be used, the angle of the face of each tooth to the general line of the knife being such that when the knives are set spirally in the revolving cone and its inclosing casing, so as to cross each other and always bear upon each other at some point in their length—that is, so that any single knife in the revolving cone will always bear at some point in its length upon some one of the knives set in the interior of the inclosing casing—the actual cutting surfaces or corners of the two sets of knives shall be parallel, or nearly so, to each other, and the aggregate length of the cutting corners of the several teeth of a knife shall be equal, or nearly equal, to the whole length of the knife, as will be more fully described.

Figure 1:
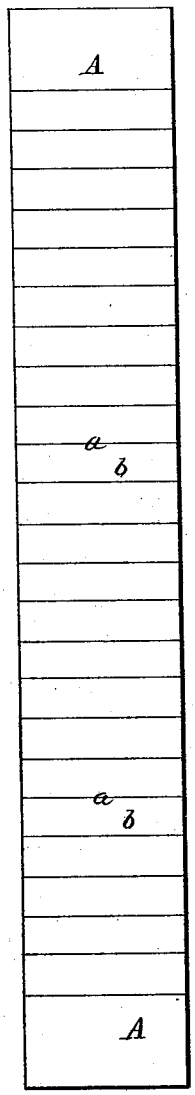
Figure 2:
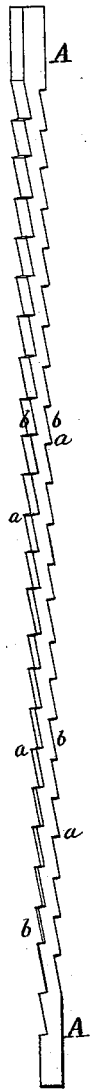

Figure 1 of the drawings is a side elevation of one of the knives. Fig. 2 is an edge view, and Fig. 3 is a plan view, of a pair of knives in their relative position to each other, as they would appear if the inclosing casing of the machine were broken away.

Figure 3:
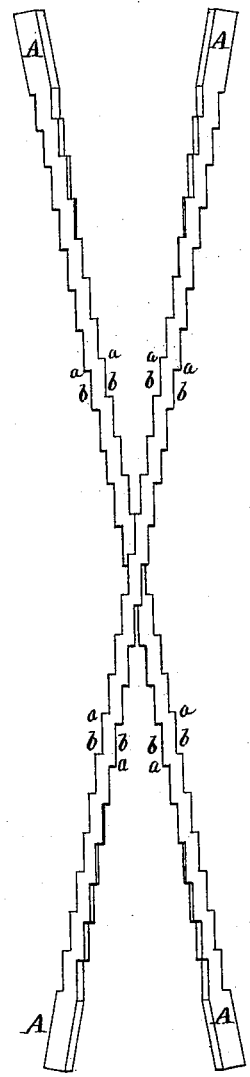

The knife A is made from a flat bar of steel or wrought-iron, and has formed upon one or both sides a series of teeth or steps, *a a*, extending across said knife in the direction of its width, said teeth or steps being of the form shown in Figs. 2 and 3, with their outer surfaces *b* at an angle to the general line of the knife, which would touch all of the points of said teeth, and parallel to each other. This knife, if made of iron, should be casehardened upon its sides, as described in the patent, No. 155,627, granted to me October 6, 1874.

The arrangement of the knives upon the conical drum and in the inclosing casing is the same as described in said patent.

Great difficulty has heretofore been experienced in the use of flock-cutting machines having straight knives in cutting greasy or soapy stock; in fact it has been almost impossible to cut some of the stock, because, if the knives were arranged spirally enough to admit of free feeding of the stock to the machine, oily or soapy stock would slip along the knives without being cut at all, or at least be discharged from the machine very imperfectly cut.

If, on the other hand, the cutters were arranged more nearly parallel, in order to cut the stock without its sliding along upon the knives, more knives had to be used to insure a bearing of the outer edge of each knife in the revolving drum upon some portion of one or more of the knives in the inclosing casing, and, as a consequence, the stock could not be fed to the cutters so as to cut to any advantage.

This difficulty is entirely overcome by the use of my improved knife, as it will be seen by reference to Fig. 3 that, while the cutters are arranged at a sufficient angle to each other to admit of the stock being freely fed thereto, the cutting corners are so nearly parallel to each other as to prevent all liability of the stock slipping thereon and passing out of the machine uncut or imperfectly cut.

In practice, I have found that a smooth knife set spirally in the revolving drum, and a serrated knife set spirally in the opposite direction in the inclosing casing, works well, and produces good flock from stock that it was impossible to make good flock from without the use of the serrated knife.

It is obvious, therefore, that the knives on the drum may be smooth and those set in the casing serrated, the knives in the casing may be smooth and those on the drum serrated, or both sets may be serrated.

What I claim as new, and desire to secure by Letters Patent of the United States, is as follows:

In a machine for cutting flock, the detachable knife A, having one or both of its sides serrated to form teeth or steps $a\ a$, extending across the same in planes parallel, or nearly so, to each other, the aggregate length of the outer faces $b$ of which are equal, or nearly equal, to the whole length of the knife, and bent and twisted as shown, to adapt it to be set spirally in the outer periphery of a revolving cylinder or drum, or in the inner periphery of its inclosing cylinder, with its sides, in all parts of its length, radial, or nearly so, to the axis of the cylinder or drum, as and for the purposes described.

Executed at South Milford this 16th day of March, 1875.

WILLARD H. SWAN.

Witnesses:
 T. G. KENT,
 J. I. C. COOK.